(12) United States Patent
Schultz

(10) Patent No.: US 6,557,571 B1
(45) Date of Patent: May 6, 2003

(54) ADJUSTABLE CRUTCH

(76) Inventor: Jimmie Reuben Schultz, 282 Yellowstone Ave., Thousand Oaks, CA (US) 91320

( * ) Notice: Subject to any disclaimer, the term of this patent is extended or adjusted under 35 U.S.C. 154(b) by 0 days.

(21) Appl. No.: 10/004,436

(22) Filed: Oct. 31, 2001

(51) Int. Cl.$^7$ ............................................... A61H 3/02
(52) U.S. Cl. .................... 135/69; 135/114; 248/157; 248/161; 248/407; 248/423
(58) Field of Search ................... 135/69, 114; 248/161, 248/407, 157, 423

(56) References Cited

U.S. PATENT DOCUMENTS

| | | | |
|---|---|---|---|
| 35,963 A | 7/1862 | Warner et al. | |
| 208,158 A | 9/1878 | Cushing | |
| 396,163 A | * 1/1889 | Kull | |
| 418,378 A | * 12/1889 | McAlpine | 135/114 |
| 464,177 A | * 12/1891 | Kelly | |
| 869,128 A | 10/1907 | Autenrieth | |
| 1,197,727 A | * 9/1916 | Finkle | 135/69 |
| 1,254,771 A | 1/1918 | Brown | |
| 1,888,972 A | 11/1932 | Chittim | |
| 3,537,463 A | * 11/1970 | Smith | 135/69 |
| 4,565,474 A | 1/1986 | Burke | 135/69 |
| 4,846,203 A | 7/1989 | Tappel | 135/69 |
| 4,917,126 A | 4/1990 | Ellmore | 135/69 |
| 5,139,040 A | 8/1992 | Kelly | 135/69 |
| 5,349,977 A | 9/1994 | Wood | 135/67 |
| 5,351,701 A | 10/1994 | Hsiao et al. | 135/72 |
| 5,402,811 A | 4/1995 | Weng | 135/68 |
| 5,445,175 A | 8/1995 | Cho | 135/68 |
| 5,752,535 A | 5/1998 | Sanders | 135/68 |
| 5,765,583 A | 6/1998 | Gamper | 135/68 |

* cited by examiner

*Primary Examiner*—Robert Canfield
(74) *Attorney, Agent, or Firm*—Koppel, Jacobs, Patrick & Heybl; Michael J. Ram

(57) ABSTRACT

A crutch constructed of two adjacently located, elongated, parallel upper and lower bows which can be moved in relationship to each other to form a vertical support of readily varied length. These bows have the same design and are therefore interchangeable, significantly reducing inventory requirements. Each bow has a series of parallel horizontal notches with the bows positioned so that the notches on each bow are on contacting surfaces. A pin inserted into parallel, adjacent notches on the two bows in cooperation with two or more collars or caps on the ends of one end of each bow fixes the relationship between the shafts which, in turn, defines the length of the vertical support. A similar concept can be used to lock a moveable centrally located lower bow between two parallel outer upper bows. This assemble provides a strong, adjustable length crutch for any height patient using only two different pairs of bow lengths.

12 Claims, 3 Drawing Sheets

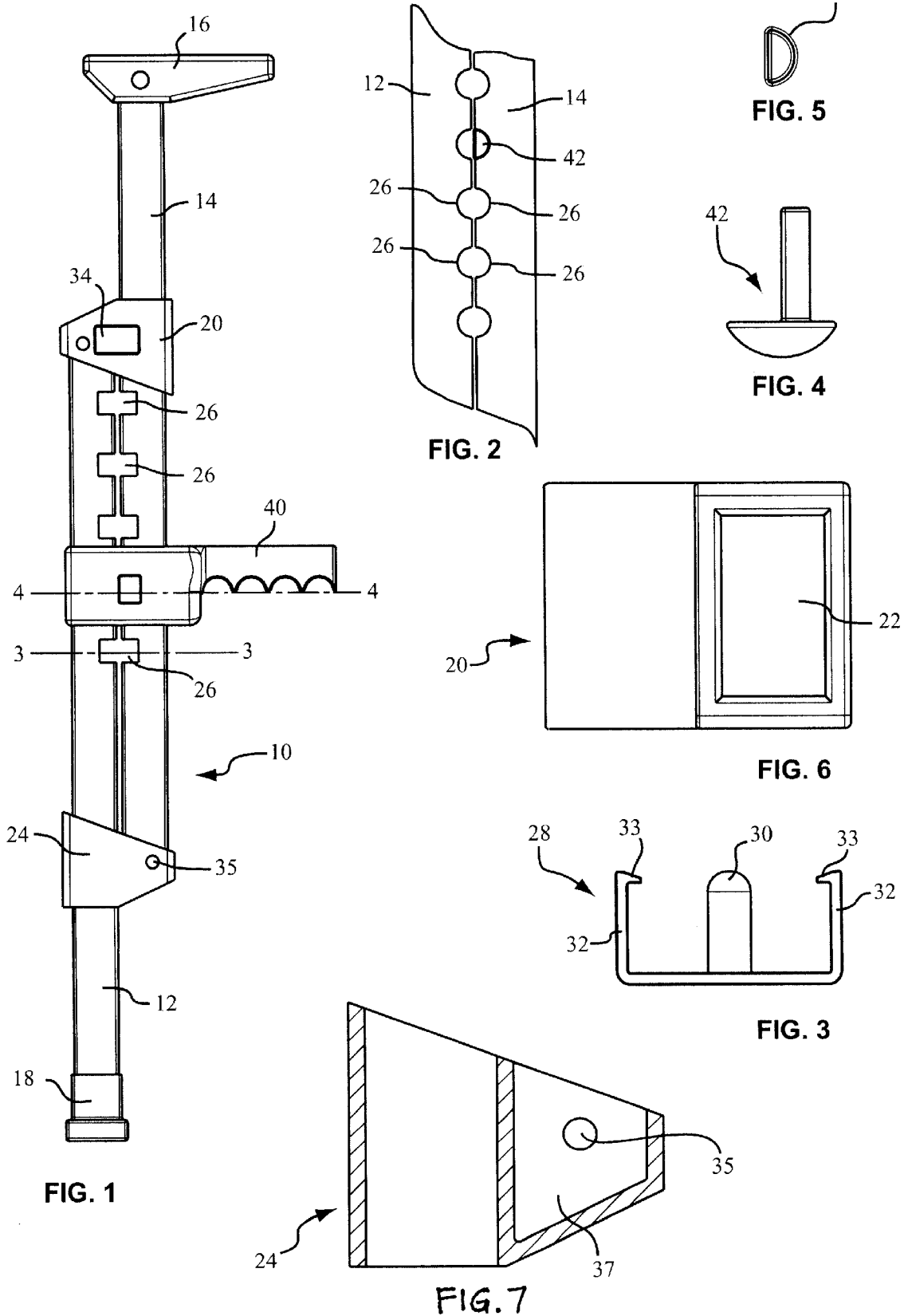

ADJUSTABLE CRUTCH

The present invention relates to a new structure for assembling a crutch having a easily adjusted length and grip height.

BACKGROUND

Crutches, fabricated from wood or metal (usually aluminum) tubes, have been used as an aid to assist injured or disabled individuals in standing or walking. While there are numerous design variations, a typical crutch has a "Y" frame design with two upper members or bows which converge at a lower end where a central leg is formed or attached. The upper ends of the upper members extend vertically upward from the point of convergence and parallel to each other but spaced apart. An underarm support brace is attached across the upper ends of the bows. A horizontal hand grip is mounted between the upper members or bows at an arms length or slightly less than an arms length from the under arm brace.

In order to adjust the length of the wooden crutch to various height individuals the two bows of the crutch usually have one or two holes there through below where the upper members converge. This hole or holes receives a bolt which also passes through one of several horizontal holes along the length of the central leg or foot piece. Once a hole in the leg is selected to provide a crutch of the proper length the bolt is secured by applying a nut to the bolt. In a like manner, the hand grip is attached between the upper members at a proper height by placing a bolt or pin through the hand grip and one of several pairs of horizontal holes in the upper members.

When the crutch is constructed from metal tubes the central leg is usually telescoped within an upwardly extending tube with the adjustment accomplished by use of an internal spring biasing a pin through aligned holes in both the lower central tube and the upwardly extending tube.

A further alternative approach has the hand grip extending at a 90 degree angle from an upper bow.

With the crutches presently available, assembly of the crutch with proper dimensions, namely the length from lower tip to under arm support and hand grip location, for each different individual is difficult. Further, use of a screw driver and wrench or pliers is required to assemble, disassemble and reassemble the crutch. This procedure is time consuming and typically requires several attempts until the crutch is properly sized for the comfort and safety of each particular user. Also, because of limited length adjustability four or five different length crutch assemblies must be inventoried.

U.S. Pat. No. 4,917,126 to Ellmore shows a crutch comprising adjacent tubes secured together in a parallel manner using an upper and lower clamp. An upper tube is telescopically mounted in a first central tube with an underarm support attached to the top end. A lower tube telescopically mounted in a second central tube has a tip on its lower end. A handgrip is clamped to a central tube. The length (height) of the crutch is adjusted by extending the upper and lower tubes. The position of these tubes in the outer tubes is fixed by using a series of holes in the outer tube and a spring loaded plunger located within the inner tube. U.S. Pat. No. 4,846,203 to Tappel shows a similar construction with the exception that the centrally located outer tube is a single tube with two parallel holes.

U.S. Pat. No. 869,128 to Autenreith shows a crutch comprised of two parallel adjacently located tubes with a coupling attached to the lower end of the upper tube so as to receive the lower tube in a sliding manner. Extending from the bottom of the upper tube is a shaft which is captured in a sleeve mounted to the lower tube. The position of the shaft in relation to the upper and lower tubes is fixed using set screws.

U.S. Pat. No. 5,349,977 to Wood shows a crutch or walker with two parallel tubes with one tube having a roughened surface. The position of the two tubes in relationship to each other is fixed through the use of a pivoting piece.

U.S. Pat. No. 1,254,771 to Brown shows a portable bath house with adjustable length uprights comprising two parallel pieces. The lower piece has two collars through which the upper piece slides. Attached to the lower piece is a spring mounted bolt which slides in a hole in the first piece and sets in one of a series of holes on the second piece.

U.S. Pat. No. 1,888,972 to Chittim also shows two piece adjustable tent poles. The lower piece has an attached collar through which the second piece attaches. Also attached to the top of the first piece is a pivoting link The link includes a traverse pin which sets in a notch on the upper bar. This arrangement prevents the pole from shortening but does not prevent lengthening, thus making it an arrangement unsuitable for a crutch. U.S. Pat. No. 208,158 to Cushing and U.S. Pat. No. 35,963 to Warner and Palmer show other extendable tent poles.

There are numerous other patents, of which U.S. Pat. Nos. 5,139,040 and 5,752,535 are examples, that show crutches constructed of telescoping tubes with a series of holes and spring mounted pins for adjustment. In addition, there are numerous patents that use bolts and other more permanent assembly means.

U.S. Pat. Nos. 5,351,701, 5,402,811, 5,445,175 and 5,765,583 are representative of adjustable designs with two upper shafts and one lower shaft. These designs all appear to have the same type of fixturing for adjusting the extension of the lower leg, namely screws, bolts or spring pins.

BRIEF DESCRIPTION OF THE INVENTION

The invention is directed to a crutch comprising two adjacently located, elongated, parallel shafts which can be moved in relationship to each other to form a vertical support of readily varied length. Each shaft has a series of parallel horizontal notches with the notches on each shaft positioned on contacting surfaces of the shafts. A pin inserted into parallel, adjacent notches on the two shafts in cooperation with two or more collars or caps fixes the relationship between the shafts which, in turn, defines the length of the vertical support. A similar concept can be used to lock a moveable centrally located shaft between two parallel outer shafts. These shafts are all held in their adjacent orientation by caps mounted on one end of each shaft with the second shaft slideable there through. This assemble provides a strong, adjustable length crutch from only two different pairs of bow lengths. Further, the upper and lower bow have the same design and are therefore interchangeable, significantly reducing inventory requirements.

BRIEF DESCRIPTION OF THE DRAWINGS

FIG. 1 shows a side view of a first embodiment of an adjustable crutch incorporating features of the invention.

FIG. 2 shows the upper and lower bows of the crutch of FIG. 1 with round pin openings.

FIG. 3 is a top view of one version of a pin used to hold the upper and lower bows in fixed relationship.

FIG. 4 is a side view of a version of a pin used to secure the handle to the crutch.

FIG. 5 is an end view of the pin of FIG. 4.

FIG. 6 is a top view of a cap which is mounted to the top end of the lower bow of the crutch for slideably retaining the upper bow.

FIG. 7 is a cutaway side view of the cap having the same construction as shown in FIG. 6 for attachment to the lower end of the upper bow for slideably retaining the lower bow.

DETAILED DESCRIPTION

Figure 8:
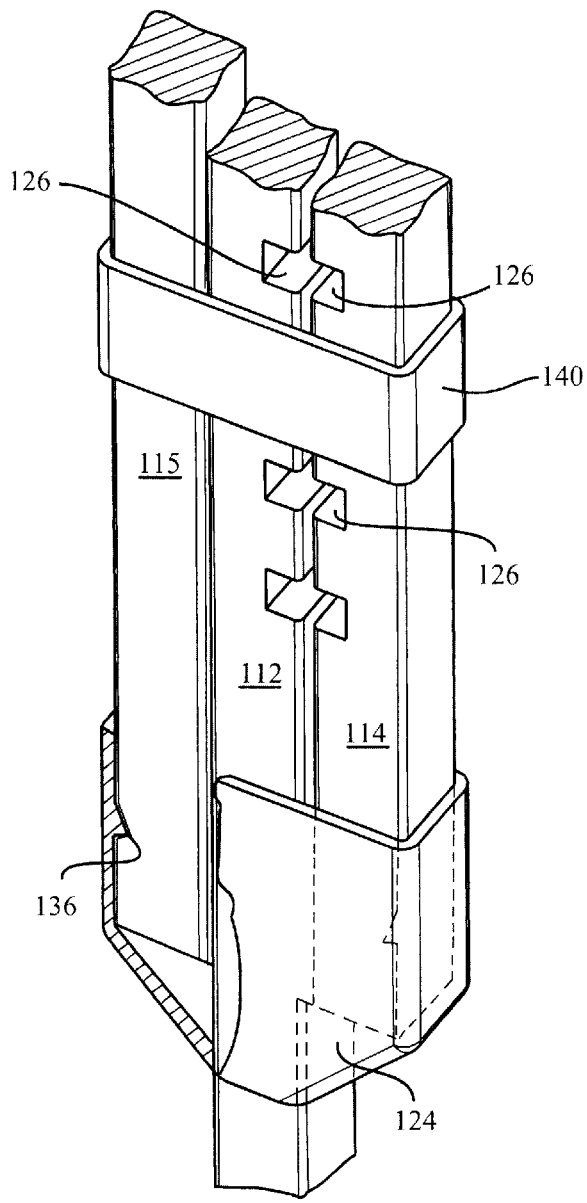
FIG. 8 is a partially cutaway side view of a second embodiment of showing the lower portion of a crutch incorporating features of the invention.

The crutch 10 uses a new method of construction and assembly. Referring to FIG. 1, a first embodiment of the crutch 10 comprises two straight bows (a lower bow 12 and an upper bow 14) which are positioned in parallel relationship next to each other with a portion of each extending beyond the end of the other bow. While designated as lower bow 12 and upper bow 14, it should be recognized that the lower and upper bows 12, 14 can be of exactly the same construction as they are interchangeable in the described design. An underarm support 16 is attached to the top of the upper bow 14. A tip 18 is attached to the bottom of the lower bow 12. A collar 20, shown in FIG. 6, is secured to the top end of the lower bow 12. The collar 20 has an opening 22 therein to receive the upper bow 14, the upper bow 14 being free to slide up and down in the opening 22 unless secured as discussed below. In a like manner, a similar lower collar 24, shown in FIG. 7 receives the lower end of the upper bow 14 in a closed bottom portion 37 where it is secured by a screw, pin or barb 35 so that the upper bow 14 is fixed but the lower bow 12 is free to slide up and down. The upper collar 20 also has an area for receiving a bracket 28 with pin 30, described below, which secures the crutch 10 at its desired length. A hand grip 40 is mounted approximately midway along the length of the crutch 10. The shape of the underarm support 16 and the hand grip 40 shown in the drawing are merely for illustrative purposes. Any suitable shaped support 16 or grip 40 known to those skilled in the art maybe attached to the crutch 10.

Figure 13:
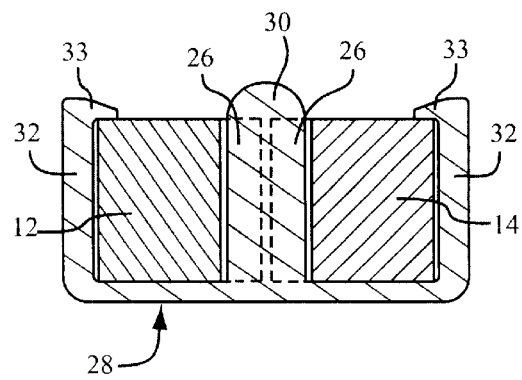
FIG. 13 is a cross section view taken along line 3—3 of FIG. 1 showing a pin in a pair of notches.
Figure 14:
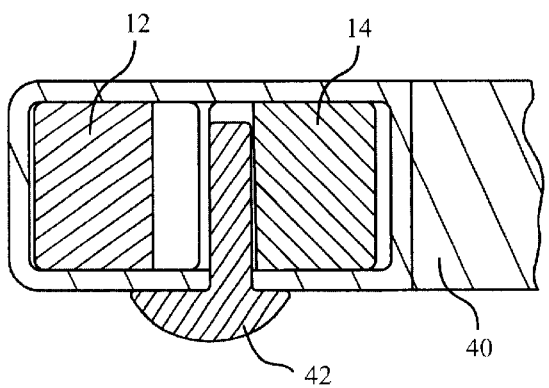
FIG. 14 is a cross sectional view taken along line 4—4 of FIG. 1 showing the pin of FIG. 4 inserted in the hand grip.

As shown in FIG. 1, and the enlarged view in FIG. 2, both the upper bow 14 and the lower bow 12 have a series of notches 26 along the length of a portion thereof. FIG. 2 shows the notches 26 to be semicircular; FIG. 1 shows them to be rectangular. Any of a variety of shapes can be used. FIG. 3 shows a bracket or clip 28 with a centrally located pin 30 of a shape and size to simultaneously fill adjacent notches on both bows 12, 14. For example, if the notch 26 is a semicircle on each bow 12, 14, the pin 30 is a circular shaft of about the same radius. If the notches 26 are rectangles then the pin 30 is a shaft with a cross section approximately the size of paired notches on the upper and lower bows. The clip 28 also has wings 32 sized to fit across the width of the collar 20, with inwardly facing barbs 33 latching on the rear side thereof so as to be held in position once the pin is inserted through the collar and into the notches 26. FIG. 13 is a cross sectional view showing a clip 28 inserted into adjacent parallel notches 26. FIG. 14 is a cross sectional view showing a half pin 42 inserted into the handle 40 filling the notch on only the upper bow 14.

To assemble the crutch the lower and upper bows 12, 14 are inserted into the collars 20, 24 and the handle 40, the underarm support 16 is attached to the upper bow 14 and the length is adjusted so that a notch 26 on each bow 12, 14 is adjacent by sliding the bows parallel to each other to a length appropriate for the user's height. The clip is then placed over, and snapped on to, the upper collar 20 with the pin 30 through the matching notches 26 now aligned with the hole 34 in the collar 30. This procedure locks the assembly in its desired length. Alternatively, the clip 28 could be inserted in to any pair of notches or more than one clip could be used.

The handle 40 is secured at the desired height by using a pin 42 of a cross section matching a notch, but not the two parallel notches. As shown in FIGS. 4 and 5, and inserted in FIG. 2 and 14, the pin 42 has a cross section to match a notch 26 as shown in FIG. 2. This allows the length of the crutch to be adjusted independent of the handle 40 without disconnecting the handle.

Crutches are composed of several components assembled into a structure sized for the intended user. In order to provide a crutch of prior dimensions, formed from wood or aluminum, four or five different length assemblies are generally required to provide a selection of crutches to meet the need of various height individuals. For example, four different size adjustable crutches are usually necessary to provide crutches for a typical child and adult population, requiring the stocking of a considerable inventory of crutches to meet patient needs. These sizes are typically a crutch adjustable from a) 29 inches to 38 inches (29"–38") for a child 3 foot, 9 inches to 4 foot, 7 inches (3'9"–4'7"), b) 37"–45" for a youth 4'6"–5'2", c) 44'–52" for an adult 5'1"–5'9", and d) 52"–60" for a tall adult 5'10"–6'6". A typical prior art wooden crutch requires five different size crutches to cover the same range of patients. As is apparent, since prior crutches have different shaped upper and lower bows, not only must many sizes be inventoried, different top and bottom components must also be stored.

Crutches incorporating features of the invention, because of their ease of assembly, can provide a broader size range with only two size combinations of upper bow 14 and lower bow 12. Further, because of the design of the product, the upper and lower bow can be of exactly the same length, appearance and construction. While the length of the standard components may be varied, in a preferred embodiment a crutch for an adult 5'5" to 7'4" may be assembled from two bows 12, 14, which are of the same length, and are interchangeable, about 42"±2" long, to which a standard underarm support 16, tip 18 and hand grip 40 is attached. In the same manner, a crutch for shorter individuals (3'9"–5'8") would be constructed from lower and upper bows 12, 14 about 30" long. This provides a single crutch, with 42" bows which is adjustable for use by 50 to 70% of the using public.

Figure 9:
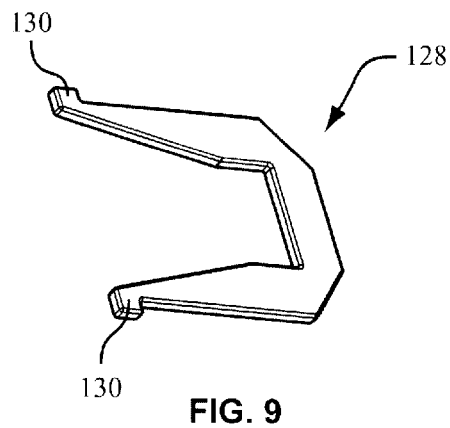
FIG. 9 is a side view of a fork shaped pin used to fix the adjustable lower bow to one of the upper bows of the crutch.
Figure 10:
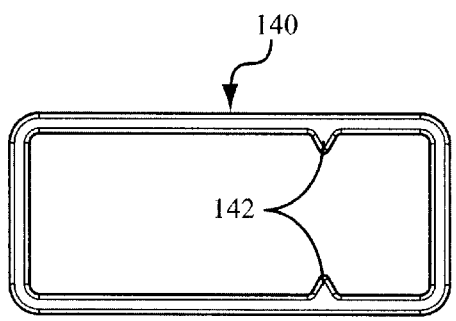
FIG. 10 is a top view of a collar used to hold the assembly of FIG. 8 together in a sliding arrangement.
Figure 15:
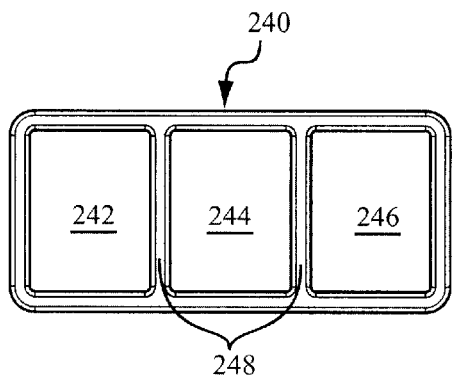
FIG. 15 is a top view of an alternative collar or bracket for use in the embodiment of FIG. 8.

FIG. 8 shows a second embodiment of the crutch 100 having two upper bows 114, 115 and one centrally located lower bow 112. Notches 126 function in the same manner to receive a full width clip 128, shown in FIG. 9 to secure the centrally located lower bow or foot piece 112 to a notched upper bow 114. In this embodiment, the clip 128 has two barbed pins 130 which are placed in two sets of vertically spaced but adjacent notches 126. In the same manner as described above, a half width barbed clip 128 can be used to secure a handle. Collar 124, partially cut away in FIG. 8 shows the lower end of upper bow 115 retained by barbed extensions 136 on the inner surfaces of the collar 124. A similar structure also retains the lower end of the other upper bow 114 in the collar 124. FIG. 10 is a top view of a band 140 sized to receive the three bows midway along their length, the band having two inwardly extending half pins 142 which rest only in the notch 126 of the notched upper bow 114. An under arm support and a hand grip (not shown) can be added in the same manner as shown for the first embodiment. This embodiment utilizing two upper bows provides for conversion of current production of three member crutch construction to use of the adjacent horizontal notch adjustment. FIG. 15 is a top view showing an alternative construction of a band 240 which has 3 bow receiving areas 242, 244, 246 to receive the three bows 112, 114, 115 and maintain them spaced apart for easier adjustment, the receiving areas 242, 244, 246 being separated by webs 248. The collar 124 would have a similar spacing and web construction.

Figure 11:
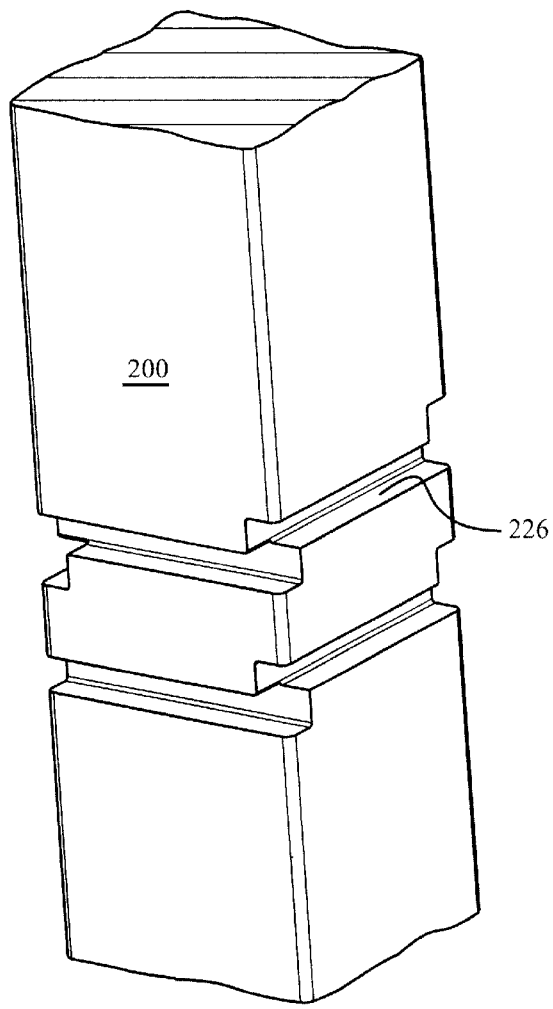
FIG. 11 is a perspective side view of a central portion of a further version of the bow of an extendable device incorporating features of the invention.
Figure 12:
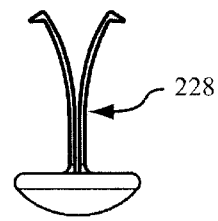
FIG. 12 is a side view of a further version of a pin used to assemble the bows of the device.

While the above description is primarily directed to the construction of a crutch, it should be recognized by one skilled in the art that the concept has much broader application. It can be used to form a broad variety of support structures which are desirably adjustable in length. Examples are canes, tent poles, book case shelf supports, light poles, etc. For such applications and to provide more length adjustment options FIG. 11 shows a shaft 200 with a square cross section and notches 226 on all four sides in a stepped spiral pattern. This provides, when matched with a second notched, square cross section rod (not shown), an upright support infinitely adjustable in length. The second notched rod may be the same as in FIG. 11 or may have a series of notches on only one side as shown in FIGS. 1 or 2. Only a short notched section is shown. However, it is contemplated that this structure be continuously repeated along the length of the bow 200. FIG. 12 shows an example of a split pin 228 for use in locking the shaft 200 to a second shaft. One or more collars such as shown in FIG. 10 are utilized to hold the shaft 200 to the second notched shaft. This bow construction provides greater length adjustment accuracy in a crutch, and because the notches are on all four sides, provides for a wide variety of hand grip attachment techniques with pins both parallel and perpendicular to the handle axis.

While the crutch design shown and described is intended for the assembly of wooden crutches, any stiff, structural material can be used for the bows including metal shafts, tubes and rods as well as composite materials. Also, while rectangular, and square cross sections are shown, one skilled in the art will recognize that any cross section may be used for the bows as long as the notch with locking pin arrangement is utilized. It is also contemplated that features in one embodiment may be incorporated in the other embodiments.

It is evident from the foregoing that there are many additional embodiments of the present invention that, while not expressly described herein, are within the scope of this invention and may suggest themselves to one of ordinary skill in the art. It is therefore intended that the invention be limited solely by the appended claims.

I claim:

1. A crutch adjustable in length comprising a first elongated straight rod constituting an upper bow and a second elongated straight rod constituting a lower bow, the upper bow having an underarm support attached to the top thereof, a hand grip attached to the upper and lower bow and extending there from at a point spaced from the underarm support, wherein:

the upper bow has a series of parallel notches formed in at least one side thereof, the notches spaced longitudinally along the length thereof and perpendicular to a central axis of the upper bow the lower bow has a series of parallel notches formed in at least one side thereof, the notches spaced longitudinally along the length thereof and perpendicular to a central axis of the lower bow the upper bow and lower bow being positioned with each of their central axis parallel, with the side of the upper bow containing notches and the side of the lower bow containing notches facing each other and being in contact, the lower bow extending beyond the lower end of the upper bow and the upper bow extending above the upper end of the lower bow, the upper bow and the lower bow being held in contact by collars attached to the lower end of the upper bow and the upper end of the lower bow, each collar enclosing the upper and lower bow with the bow not attached free to slide longitudinally through an opening in said collar, and at least one notch on the upper bow and one notch on the lower bow being adjacent with a first pin positioned in said adjacent notches, said first pin holding the upper and lower bow in a fixed but adjustable longitudinal relationship.

2. The crutch of claim 1 wherein the hand grip is moveable longitudinally along the length of the crutch, the longitudinal position of the hand grip being fixed by a second pin inserted there through and, the second pin resting only in at least one of the notches in the upper bow or lower bow.

3. The crutch of claim 2 wherein, after attachment of the hand grip, the lower bow is moveable longitudinally in relationship with the upper bow to adjust the length of the crutch by removing the first pin, said adjusted length being fixed by the insertion of the first pin into a different set of adjacent notches on the upper and lower bows.

4. The crutch of claim 1 wherein the upper bow and lower bow have a square or rectangular cross section.

5. The crutch of claim 4 wherein at least the upper bow has a series of parallel notches on each of the four sides of the bow.

6. The crutch of claim 1 wherein the upper bow and the lower bow are of the same cross sectional shape and length and notch location.

7. A crutch adjustable in length comprising two elongated straight rods constituting upper bows and a third elongated straight rod constituting a lower bow, the upper bows having an underarm support attached to the top thereof, a hand grip attached to the upper and lower bows and extending there from at a point spaced from the underarm support, wherein:

at least one of the upper bows has a series of parallel notches formed in at least one side thereof, the notches spaced longitudinally along the length thereof and perpendicular to a central axis of said upper bow, the lower bow has a series of parallel notches formed in at least one side thereof, the notches spaced longitudinally along the length thereof and perpendicular to a central axis of the lower bow, the upper bows and lower bow being positioned with each of their central axis parallel, with the side of the at least on upper bow containing notches and the side of the lower bow containing notches facing each other, the lower bow extending beyond the lower end of the upper bows and the upper bows extending above the upper end of the lower bow, the upper bow and the lower bow being held in orientation to each other by a collar attached to the lower ends of the upper bow, and a second collar enclosing the upper and lower bows with the lower bow free to slide longitudinally through a central opening in said collar, and at least one notch one of the upper bows and one notch on the lower bow being adjacent with a first pin positioned in said adjacent notches, said first pin holding the upper and lower bow in a fixed but adjustable longitudinal relationship.

8. The crutch of claim 7 wherein the hand grip is moveable longitudinally along the length of the crutch, the longitudinal position of the hand grip being fixed by a second pin inserted there through and, the second pin resting only in at least one of the notches in the upper bow or lower bow.

9. The crutch of claim 8 wherein, after attachment of the hand grip, the lower bow is moveable longitudinally in relationship with the upper bow to adjust the length of the crutch by removing the first pin, said adjusted length being fixed by the insertion of the first pin into a different set of adjacent notches on the upper and lower bows.

10. The crutch of claim 7 wherein the first pin has at least two tines spaced for insertion in two parallel, vertically spaced sets of notches in the upper and lower bow.

11. The crutch of claim 7 wherein at least one of the upper bows and the lower bow are of the same cross sectional shape and length and notch location.

12. An extendable support adjustable in length comprising a at least an elongated, straight, first shaft and an elongated, straight second shaft, each shaft having two ends and at least one flat surface extending between the two ends along the length thereof, wherein:

the flat surface on the first shaft has a series of parallel notches formed therein, the notches spaced longitudinally along the length thereof and perpendicular to a central axis of said first shaft, the flat surface on the second shaft has a series of parallel notches formed therein, the notches spaced longitudinally along the length thereof and perpendicular to a central axis of said second shaft the first shaft and the second shaft being positioned with each of their central axis parallel, with the flat surface of the first shaft containing notches and the flat surface of the second shaft containing notches facing each other and being in contact, the first shaft extending beyond the lower end of the second shaft and the second shaft extending above the upper end of the first shaft, the first shaft and the second shaft being held in contact by collars attached to the lower end of the second shaft and the upper end of the first shaft, each collar enclosing the first and second shaft with the shaft not attached being free to slide longitudinally through an opening in said collar, and at least one notch on the first shaft and one notch on the second shaft being adjacent with at least one removeable pin positioned in said adjacent notches, said pin holding the first and second shaft in a fixed but adjustable longitudinal relationship.

* * * * *